United States Patent

Ban

[15] 3,672,686

[45] June 27, 1972

[54] PROGRAMMED TRACK SELECTING APPARATUS

[72] Inventor: Itsuki Ban, 829, Higashi-Oizumimachi, Nerima-ku, Tokyo-to, Japan

[22] Filed: Oct. 6, 1969

[21] Appl. No.: 863,957

[30] Foreign Application Priority Data

Oct. 9, 1968 Japan....................................43/73125
Jan. 22, 1969 Japan....................................44/4060

[52] U.S. Cl...............274/4 A, 179/100.2 Z, 179/100.2 MD, 274/4 F

[51] Int. Cl........................................................G11b 21/08

[58] Field of Search.................274/4 A, 11 A, 11 B, 4 F, 4 G, 274/4 B; 179/100.2 Z, 100.2 CA, 100.2 MI

[56] References Cited

UNITED STATES PATENTS 2,821,576 1/1958 Gaubert.................................274/4 F
3,507,501 4/1970 Lear.......................................274/4 A
3,512,786 5/1970 Ban........................................274/4 F

FOREIGN PATENTS OR APPLICATIONS 877,173 9/1961 Great Britain..........................274/4 F

*Primary Examiner*—Leonard Forman
*Assistant Examiner*—Dennis A. Dearing
*Attorney*—Jacobs & Jacobs

[57] ABSTRACT

A programmed track selecting apparatus for a multiple tape cartridge player utilizing a plurality of multi track endless magnetic tape cartridges includes a rotary cam for positioning a magnetic head to the desired track, a plurality of track selection switches for selecting a desired track, and a rotary switch rotatable in synchronism with the rotary cam and including switches corresponding to the track selection switches, rotation of the rotary cam being controlled by the track selecting switches and the rotary switch.

5 Claims, 7 Drawing Figures

PROGRAMMED TRACK SELECTING APPARATUS

BACKGROUND OF THE INVENTION

The present invention relates to a programmed track selecting apparatus for a multiple tape cartridge player utilizing a plurality of multi track endless magnetic tape cartridges, and more particularly to such apparatus capable of predesignating tracks to be reproduced on the tape within a cartridge to be played and of automatically reproducing the only predesignated track.

A tape player utilizing multi track or multi channel endless magnetic tape cartridges, is normally provided with a track changing device to reproduce each of tracks or channels in succession.

One of the types of the track changing device includes a rotary cam actuatable so as to allow a magnetic head to synchronize with tracks thereby scanning across the tape, a solenoid rotatably and intermittently driving the cam whenever energized, and a control circuit for the solenoid having a contactor which includes two feeler contacts shorted by a conductive patch on the tape, the solenoid being actuated in response to the passage of the conductive patch through the contactor whereby the magnetic head is successively shifted to a position adaptable for each of tracks on the tape. In this manner, all tracks are successively reproduced by such track changing device. On the other hand, the tape player utilizing a plurality of tape cartridges includes a cartridge changing or selecting device as well as aforementioned track changing device. The cartridge changing or selecting device is actuated in response to a cartridge changing signal generated in response to the completion of the play of the played cartridge and functions to engage the next cartridge in play mode. In those multiple endless magnetic tape cartridge player, the cartridges are engaged in play mode and all record tracks are continuously played. However, to the user it is not desired to reproduce all the tracks on the tape except on a special case. Reproduction of the desired track is preferable. Further, it is to be desired that the track as predesignated is automatically selected and reproduced.

SUMMARY OF THE INVENTION

It is a principal object of the present invention to provide a programmed track selecting apparatus for a multiple tape cartridge player utilizing a plurality of multi track endless magnetic tape cartridges, which is capable of predesignating the track to be reproduced and of automatically selecting and reproducing the designated track.

Another object of the invention is to provide a programmed track selecting apparatus for a multiple tape cartridge player utilizing a plurality of multi track endless magnetic tape cartridges, which is capable of generating a cartridge changing signal in response to the completion of reproduction of the predesignated track in the played tape cartridge and of effecting the exchange the tape cartridge to be played.

A further object of the invention is to provide a programmed track selecting apparatus for a multiple tape cartridge player utilizing a plurality of multi track endless magnetic tape cartridges, wherein by means of a rotary switch having switches corresponding to track selecting switches and individual selecting switch corresponding to an individual track on the tape, rotation of a rotary cam is controlled in order that a magnetic head is shifted to a position adaptable for each track.

Yet another object of the invention is to provide a programmed track selecting apparatus for a multiple tape cartridge player utilizing a plurality of multi track endless magnetic tape cartridges, wherein a rotary switch is rotated synchronizing with rotation of a rotary cam and there is provided a switch for generating a cartridge changing signal after the completion of reproduction of all the designated tracks.

Still further object of the invention is to provide a programmed track selecting apparatus for a multiple tape cartridge player utilizing a plurality of multi track endless magnetic tape cartridges, wherein a track selecting switch is operated by a track selection means provided in the tape cartridge.

Further objects and numerous additional advantages of the invention will become apparent from the following detailed description and annexed drawings, wherein:

DESCRIPTION OF THE PREFERRED EMBODIMENTS

Figure 1:
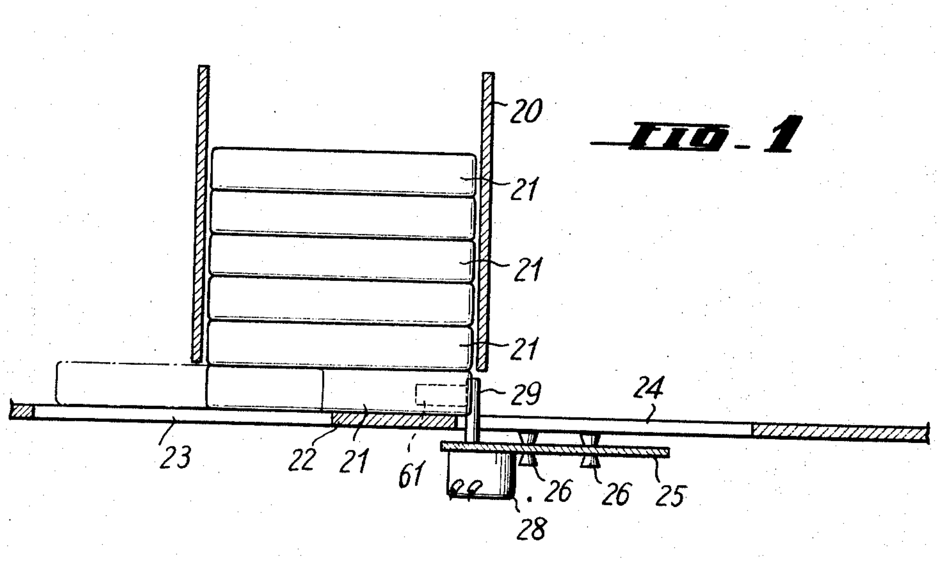
FIG. 1 is a side elevational view of one type of a multiple tape cartridge player to which an apparatus according to the present invention is applicable, with partly omitted away.
Figure 2:
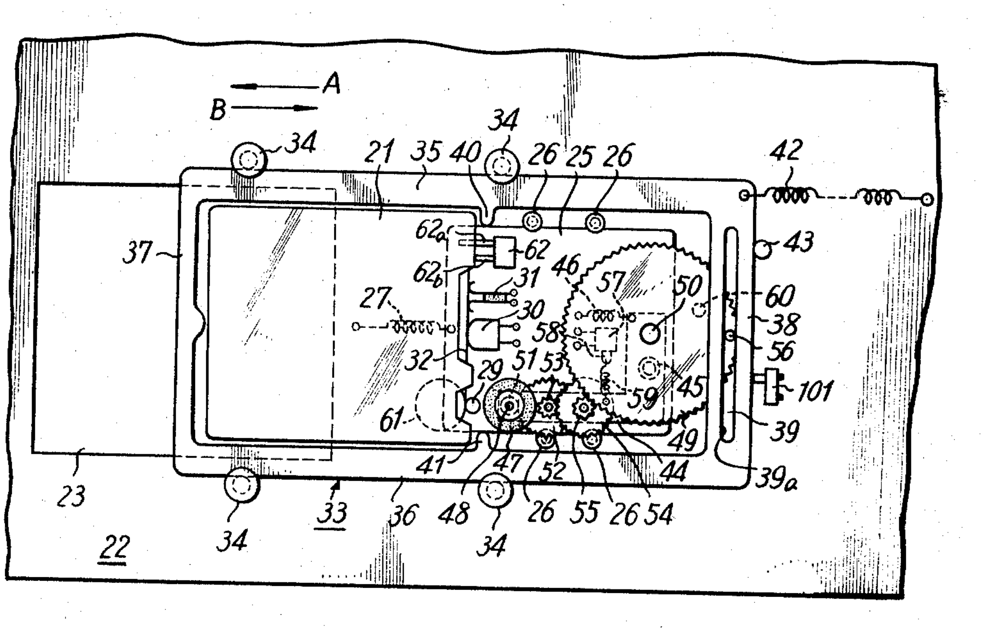
FIG. 2 is a plan view of the multiple tape cartridge player shown in FIG. 1, with the container in FIG. 1 being omitted away.

The example of magnetic tape playing apparatus utilizing a plurality of endless magnetic tape cartridges shown in FIGS. 1 and 2 includes a container 20 receiving a stack of plurality of the cartridges 21 which are vertically located from a horizontal platform 22 so as to include a space of size larger than the cartridge.

The container 20 is in a form of square shell opened upwardly and outwardly and the cartridge is admitted into the upper open end. The lowermost cartridge 21 stacked is accessible through the lower open end of the container 20 and rests on the horizontal platform 22 and played in a manner as will be described hereinafter. Upon completion of this play, the next cartridge is moved by the dead weight load to the lower end of the container 20 to rest on the platform and then is played. In this manner, the cartridges 21 received in the container 20 are successively and downwardly moved by virtue of the dead weight load and are played in succession. A slide plate 25 is slidably mounted through guides 26 downwardly of the horizontal platform 22 and is given the movable force in the left hand direction by a tension spring 27. An electric motor 28 is firmly mounted on the plate 25 at the underside thereof. A rotating shaft or capstan 29 extends upwardly through a hole (not shown) in the plate and an opening 24 bored through the platform 22. Provided on the plate 25 are a magnetic head 30, a feeler contactor 31 containing two feeler contacts, each of which passes through the opening 24 and projects from the plarform 22. These parts such as the capstan, magnetic head 30 and the feeler contactor 31 may engage and endless magnetic tape 32 within the cartridge 21 as will be described in more detail hereinafter.

Mounted between the platform 22 and the container 20 is a frame 33 which is slidably supported by guides 34 so as to be movable in the direction of the arrow A and B. The frame 33 which is rectangular comprises longitudinal members 35 and 36 oppositely facing to each other and transverse member 37 and 38 oppositely facing to each other. A elongated slot 39 is formed in the transverse member 38 and a projection 40 is constituted inwardly of the longitudinal member 35. In opposition to the projection 40, a projection 41 is formed inwardly of the longitudinal member 36. The frame 33 is given a movable force in the direction of the arrow B by a tension spring 42. This movement of the frame is held by a stopper pin 43 mounted on the platform 22. As far as the frame 33 abuts against the stopper pin 43, a substantially square area defined by the longitudinal members 35, 36, the transverse member 37 and the projections 40, 41 is positioned beneath the container 20 and within which area the lowermost of the cartridge 22 removed from the container 20 is retained.

A pusher means is provided on the plate 25 to move the frame 33 in the direction of the arrow A by virtue of the turning effort of the capstan 29. The pusher or mobile means is provided with a L-shaped lever 44 pivotally mounted on a pin 45 on the plate 25. The lever 44 is urged by a tension spring 46 in the counterclockwise direction. The lever 44 is also provided at one end thereof with a frictional wheel 47 rotatably mounted on an axis 48 and at the other end provided with a wheel 49 rotatably mounted on a shaft 50. The frictional wheel 47 as will be detailed hereinafter, is normally away from the capstan 29 and may be rotated by the capstan 29 when the lever 44 is rotated in the clockwise direction against the bias of the spring 46 and thus abuts against the capstan 29. Rotation of the frictional wheel 47 is decelerated by train of gears 51, 52, 53, 54 and 55 and imparted to the wheel 49. The wheel 49 has a pin 56 extending upwardly through the slot 39 in the frame 33. The pin 56 is positioned adjacent the periphery of the wheel 49 and provides circular motion with rotation of the wheel 49. Thus, rotation of the wheel 49 allows the pin 56 to move the frame 33. Provided on the plate 25 is a solenoid 57 whose plunger 58 is coupled by a spring 59 to the lever 44. When the solenoid 57 is energized, the lever 44 is caused to be moved to a position where the frictional wheel 47 abuts against the capstan 29. The wheel 49 begins its rotation upon abutment of the frictional wheel 47 with the capstan 29 to allow the pin 56 to abut against the leftward edge **39*a* of the slot 39 to provide reaction for the shaft 50 to generate the right hand force thereon. With such the force, the lever 44 is given the clockwise turning effort even after the solenoid has been in non-operative condition thereby maintaining abutment of the frictional wheel 47 with the capstan 29. In the initial stage of rotation of the wheel 49, the plate 25 is slided in the rightward direction against the elastic force of the spring 27. When slide movement of the plate 25 is prevented by a stopper pin mounted on the platform 22 underneath thereof, the frame 33 is slided in the direction of the arrow A against the bias of the spring 42. Assuming that the wheel 49 is rotated from the position shown in FIG. 2 until it makes nearly its half rotation, the cartridge 21 held by the frame 33 is moved from the opening 23 in the platform 22 and dispensed downwardly of the platform 22. Further rotation of the wheel 49 moves the frame 33 in the direction of the arrow B. Movement of the frame 33 is prevented by the stopper pin 43 to allow the next cartridge 21 to escape from the container 20 and thus the cartridge is held by the frame 33. Now the wheel 49 makes about one rotation to disconnect the pin 56 from the leftward edge 39a of the slot 39 and to swingably return the lever 44 in the counterclockwise direction under the influence of the spring 46 whereby the plate 25 is further slided in the leftward direction by the spring 27. Accordingly, abutment of the frictional wheel 49 with the capstan 29 is released to prevent rotation of the wheel 49. If the plate 25 is shifted in the leftward direction by the elastic force of the spring 46, the capstan 29 abuts against a pinch roller 61 in the cartridge 21 held by the frame 33 to drivingly transport the magnetic tape 32 to cause the tape to come in contact with the magnetic head 30 thereby playing the cartridge 21. As aforementioned, every time the solenoid 57 is energized, the cartridge held by the frame 33** in the play position is moved away therefrom and the next cartridge is brought to the play position for its play.

Figure 3:
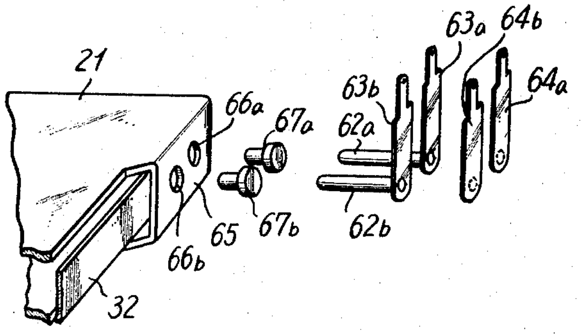
FIG. 3 is a perspective view showing a relationship between the tape cartridge illustrated in FIG. 1 and 2 and the track selecting switch shown in FIG. 2.

Provided on the plate 25 is a switch means 62 which includes slide rods **62*a* and 62*b* actuated in a manner to be described hereinafter, by the cartridge 21 and which selects one of the recording tracks to be reproduced on the tape 22. As shown in FIG. 3, the switch means 62 comprises a switch including a contact 63*a* fixed to the slide rod 62*a* and a contact 64*a* opposed thereto, and a switch including a contact 63*b* secured to the slide rod 62*b* and a contact 64*b* opposed thereto. The contacts 63*a*, 64*a* and 63*b*, 64*b* are respectively away from each other and may be closed upon depression of the rods 62*a*, 62*b*. As seen from FIG. 3, holes 66*a*, 66*b* are formed in the leading edge 65 of the cartridge 21 to receive plug members 67*a*, 67*b* for plugging them up. The cartridge in which the hole 66*b* is plugged up by the plug member 67*b* is not in the play position, the slide rod 62*a* for the switch means 62 is pressed as shown in FIG. 2 to enter into the hole 66*a* so as not to be depressed. In this instance, a track program select means according to the present invention, as will be fully described hereinafter, reproduces the track on the tape 32, corresponding to the opened contacts 63*a*, 64*a***.

The cartridge shown in FIG. 3 contains the tape on which two record-tracks (four tracks on the tape for stereo). To this end, the two holes **66*a*, 66*b* are provided, however, four holes are, of course, for four tracks (eight tracks for stereo). The switch means 62 provides switches of a number corresponding to the record-tracks. Figures following FIG. 3 illustrates a record-tracks program means, in which similar numerals are used to illustrate like part shown in FIG. 1 to FIG. 3**.

Figure 4:
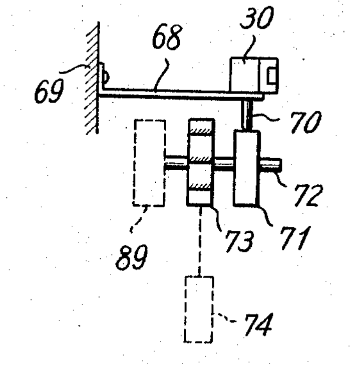
FIG. 4 is a side elevational view showing a magnetic head mobile means shown in FIG. 2.

FIGS. 4 shows a track shift mechanism by which the magnetic head 30 is moved to a plurality of different predetermined fixed points across the width of the tape 32 to change over the record track to be reproduced. The magnetic head 30 is firmly secured to support plate or leaf spring 68 which one end portion is fixed to bracket 69 on the slide plate 25 (FIGS. 1, 2). A pin 70 is mounted on the leaf spring 68 at the underneath thereof. The rounded bottom end of the pin 70 is arranged to ride on the cam 71. The leaf spring 68 is given the downward elastic force to maintain the pin 70 and cam 71 in operative relation, The cam 71 is rigidly mounted on a rotatably provided shaft 72 and adapted to be rotated as the shaft 72 is rotated. Upon rotation of the cam 71, the leaf spring 69 is swung by the pin 70 to shift the magnetic head. A ratchet wheel 73 is firmly mounted on the shaft 72 and rotated by a drive mechanism 74 indicated by the dotted line to thus rotate the shaft 72 and the cam 71. A control device 89 indicated by the dotted line is coupled to the shaft 72.

Figure 5:
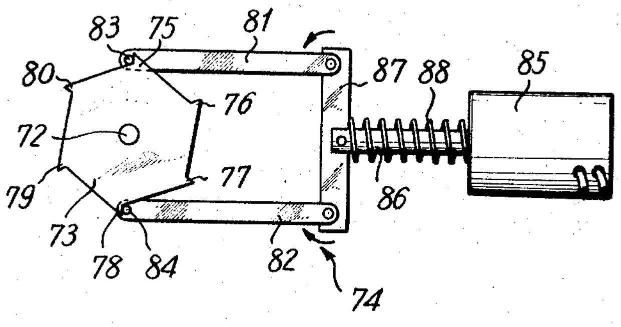
FIG. 5 is a representation showing a cam driving mechanism shown in FIG. 4.

The detail of the drive mechanism 74 will be explained referring to FIG. 5. The ratchet 73 includes six gear teeth 75, 76, 77, 78, 79 and 80. Reciprocating levers 81, 82 are provided in relation to the ratchet 73, and pins 83, 84 mounted on the levers 81, 82 mesh with the two teeth. The reciprocating levers 81, 82 are pivotally mounted on a lever 87 fixed to a plunger of a solenoid 85 and urged respectively by a spring (not shown) in the direction of the arrow. Energization of the solenoid 85 attracts the plunger 86 against a compressive spring 88 to allow the pin 83 on the lever 81 to feed the ratchet wheel 73 by one tooth. At this point, the pin 84 on the lever 82 is beyond the teeth 77, 78 to mesh with the tooth 78. Accordingly, supply of energy to the solenoid 85 is cut off to return the plunger 86 to the initial position whereby the pin 84 on the lever 82 feeds the ratchet wheel 73 by one tooth. In other words, whenever the solenoid 85 is energized the ratchet wheel 73 is advanced by two teeth, that is, the ratchet wheel makes a revolution of 120°.

Now, referring to FIG. 6, the control device 89 will be fully detailed hereinafter. A rotary switching means 90 is provided on the shaft 72. The rotary switching means 90 comprises a rotary disk 91 of an insulation fixed to the shaft 72 and a fixed ring 92 of an insulation concentrically provided in relation to the rotary disk. A conducting piece 93 is mounted on the rotary disk 91 on the surface thereof. Switches 94, 95 and 96 are arranged on the surface of the fixed ring 92 to form an angle of 120° between the switches. Those switches 94, 95 and 96 are provided with a pair of contacts electrically separated, the contacts being shorted by the conductive piece 93 on the rotary disk 91 rotatable with rotation of the shaft 72. In series, running from a plus terminal of an electrical source 97 to a minus terminal of the source 97, are the switch 94, a normally opened switch 98 and magnetic coil 85a within the solenoid 85. In series, running from the plus terminal of the source 97 to the minus terminal of the source 97, are the switch 95, a normally opened switch 99 and the magnetic coil 85*a*. The switches 98, 99 are received, for instance, in the switch 62 shown in FIG. 2 for selecting the record-tracks to be reproduced on the magnetic tape.

In series, running from plus terminal of the source 97 to minus terminal of the source 97, are the contactor 31 and the magnetic coil 85*a*. The two feeler contacts of the contactor 31 are shorted by a conductive path 100 which is secured to track end start position on the magnetic tape 32. In series, running from plus terminal of the source 97 to minus terminal of the source 97, are a switch 101 and capacitor 102 that has in parallel with a relatively high resistor 103. The switch 101 is actuated, for example, by the frame 33 (FIG. 2) and is closed when the frame 33 is in the position shown in FIG. 2. In series, running from plus terminal of an electrical source 104 to minus terminal of the source 104, are the switch 96 and the magnetic coil 57*a* within the solenoid 57 (FIG. 2).

Mode of operation as to the record-track program selecting means in FIG. 4 to 6 will be hereinafter described in connection with the operation of the player shown in FIGS. 1 to 3.

Now the rotary disk 91 assumes a condition in which the conductive piece 93 on the rotary disk 91 shorts the connection between the two contacts to apply the current from the source 104 to the magnetic coil 57*a* actuating the solenoid 57. The frame 33 is slided, as previously explained, in the direction of the arrow A in response to the operation of the solenoid 57 and is further slided in the direction of the arrow B. At the critical end where the frame 33 is slided in the direction of the arrow A, the cartridge which has been in the play position is moved from the opening 23 and discharged downwardly of the platform 22. On the other hand, at the critical end where the frame 23 is slided in the direction of the arrow B, the next cartridge 21 is brought to the play position and the switch 101 is closed. Only the hole 66*b* of the cartridge 21 in the play receives the plug member 67*b*, and the switch 99 is closed, as shown in FIG. 6 to maintain the switch 98 opened. When the switch 101 is closed by the frame 33, the heavy current from the source 97 through the capacitor 102 to the magnetic coil 85*a* within the solenoid 85 is caused to be reciprocated to rotate the ratchet wheel 73 by 120°. In pursuance of rotation of the ratchet wheel 73, the cam 71 and the rotary disk 91 make a revolution of 120° to shift the magnetic head 30 and the connection between the two contacts of the switch 94 is shorted by the conductive piece 93 on the rotary disk 91. Although the switch 94 is closed, the solenoid 85 would not be actuated since the switch 98 is opened so that the current is not drained to the magnetic coil 85*a*. In this manner, the magnetic head 30 is positioned in a position corresponding to the record-track on the tape in relation to the switch 98 thereby reproducing the record-track. Assuming that the endless magnetic tape 32 completes its one cycle and the connection between the two feeler contacts of the contactor 30 is shorted by the conductive patch 100 on the tape, the coil 85*a* is supplied with the current to actuate the solenoid 85. As a result, the ratchet wheel 73, the cam 71, and the rotary disk 91 are all rotated by 120° and the head 30 is moved from the record-track on the tape with respect to the switch 98 and is moved to a position corresponding to the record-track on the tape with respect to the switch 99 to short the connection between the two contacts of the switch 95 by means of the conductive piece 93 on the rotary disk 91. Since the switch 99 has been closed, upon closing of the switch 95 the solenoid 85 is energized to rotate the cam 71, the rotary disk 91 as well as the shaft 72. Consequently, the head 30 moves away from the record-track on the tape 32 in relation to the switch 99 and the record-track is not reproduced while the cartridge changing electrical signal from the source 104 is given the solenoid 57 due to the fact that the switch 96 is closed by the conductive piece 93. This begins slide movement of the frame 33 and reproduces only the record-track on the tape with respect to the hole 66a in which the plug member is not received whereby the cartridge 21 in the play position is moved from the opening 23 and exhausted downwardly of the horizontal platform 22. As above mentioned, when reproduction of the predesignated record-track is completed as programmed by opening and closing the track selecting switches 98, 99, the cartridge changing signal is generated to exchange the tape cartridge to be played. In this connection, it will be apparent that the cartridge is exchanged upon reproduction of the two record-tracks where both the switches 98 99 are opened, and to the contrary where both the switches 98, 99 are closed, neither of the record-tracks are reproduced to exchange the cartridge.

Figures 6, 7:
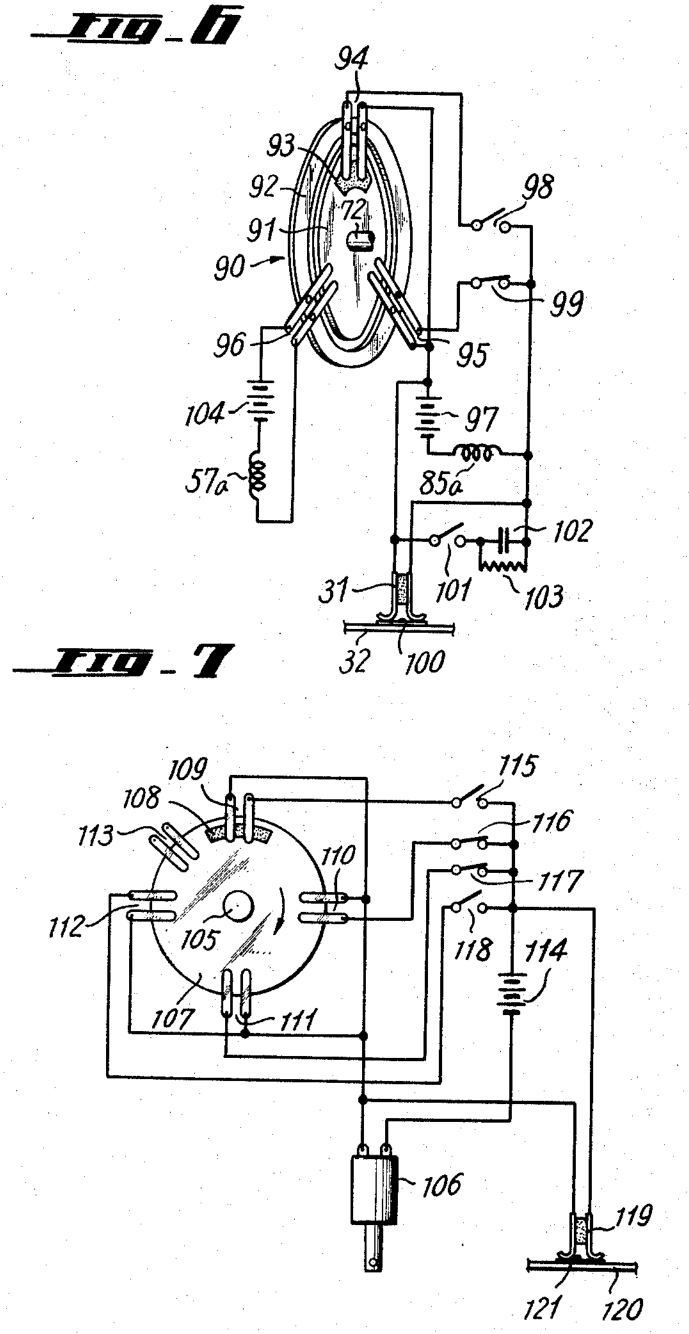
FIG. 6 is an electric circuit diagram for the programmed track selecting apparatus according to the present invention applied to the player shown in FIGS. 1 and 2.
FIG. 7 is an electric circuit diagram for another programmed track selecting apparatus according to the present invention.

The control device shown in FIG. 6 provides two record-tracks (four in the stereo) for the magnetic tape whereas the control device in FIG. 7 provides four tracks (eight in the stereo) for the magnetic tape.

In FIG. 7, numeral 105 designates a shaft on which a cam (not shown) for shifting the magnetic head. This shaft is different from the shaft 72 in FIGS. 4 to 6 in that it is rotated by 90° every time a solenoid 106 (corresponding to the solenoid 85 in FIG. 5) is actuated. The solenoid 106 similar to the solenoid 85 (FIG. 5) is adapted to rotate a ratchet wheel (not shown) which is different from the ratchet wheel 73 (FIG. 5) and includes eight teeth. Rigidly mounted on the shaft 105 is a rotary disk 107 the surface of which a conductive piece 108 is provided. Switches 109 to 113 each consisting of a pair of contacts are mounted on a fixed member (not shown) of insulation, which is provided corresponding to the rotary disk 107. The switches 109 to 112 are spaced away to form an angle of 90° to one another and the switch 113 is provided between the switches 112 and 109. In series, running from plus terminal of an electrical source 114 to minus terminal of the source 114, are normally opened track selecting switch 115, the switch 109 and the solenoid 106. In series, running from plus terminals of the source 114 to minus terminal of the source 114, are normally opened track selecting switch 116, the switch 110 and the solenoid 106. In series, running from plus terminal of the source 114 to minus terminal of the source 114, are normally opened track selecting switch 117, the switch 111 and the solenoid 106. In series, running from plus terminal of the source 114 to minus terminal of the source 114, are normally opened track selecting switch 118, the switch 112 and the solenoid 106. In series, running from plus terminal of the source 114 to minus terminal of the source 114, are a contactor 119 and the solenoid 106. The contactor 119 similar to the contactor 31 (FIGS. 2 and 6) consists of two feeler contacts that are shorted by a conductive patch 121 provided on an endless magnetic tape 120 within a cartridge (not shown) and member of insulation for supporting the contacts. In FIGS. 7, the track selecting switches 115, 118 are opened and the first and fourth record-tracks are designated while the first track is reproduced. When the two feeler contacts of the contactor 119 is shorted by the conductive patch 121 upon completion of reproduction of the first track, the solenoid 106 is energized by the source 114 to rotate the shaft 105 by 90° in the direction of the arrow. As the shaft 105 is rotated, the rotary disk 107 is rotated to a position where the switch 110 is closed by the conductive piece 108. Thus, the solenoid 106 is energized from the source 114 via the track selecting switch 117, the switch 110 to rotate the shaft 105 by 90° in the direction of the arrow. Due to rotation of the shaft 105, the rotary disk 107 is rotated to a position where the switch 111 is closed by the conductive piece 108. Since the track selecting switch 117 has been closed, the solenoid 106 is energized from the source 114 upon closing of the switch 111 to thus rotate the shaft by 90° in the direction of the arrow whereby the rotary disk 107 is rotated to a position where the switch 112 is closed by the conductive piece 108. In spite of closing of the switch 112, the solenoid 106 is not caused to be energized not to rotate the shaft 105 since the track selecting switch 118 has been opened. Thus, the fourth track on the tape 120 corresponding to the selecting switch 112 begins its reproduction. When the connection between the two feeler contacts of the contactor 119 is shorted by the conductive patch 121 on the tape 120 after the fourth track completes its reproduction, the solenoid 106 is energized from the source 114 to rotate the rotary disk 107 by 90°. With rotation of the rotary disk 107, the conductive piece 108 is away from the switch 112 and is shifted to a position where the switch 109 is closed. In the course of this shifting of the conductive piece 108, the switch 113 is closed by the conductive piece 108. By closing the switch 113, the cartridge changing signal is generated to actuate, for instance, the solenoid 57 (FIG. 2) exchanging the cartridge to be played.

As described in the above, completion of reproduction of the predesignated all the record-track effects exchange of the cartridge to be played and the next cartridge is successively played. It will be readily understood that if the track selecting switches 116, 118 have been opened for the next cartridge, the second and fourth tracks will be selected and reproduced. It will be also understood that if the track selecting switches 115 to 118 have been opened, all the four tracks will be successively reproduced whereas no tracks will not be reproduced to effect exchange of the cartridge if the track selecting switches 115 to 118 have been closed.

The invention and its attendant advantages will be understood from the foregoing description. It is to be understood that changes and variations may be made without departing from the spirit and scope of the invention as defined in the appended claims.

What is claimed is:

1. A programmed track selecting apparatus for a multiple tape cartridge player in which a plurality of multi track endless magnetic tape cartridges are utilized and which includes a cartridge changing device for exchanging the tape cartridge to and from a play position in response to a cartridge changing signal, and a track changing device having rotary cam means for positioning a magnetic head to synchronize with the tracks thereby scanning across the tape in a cartridge, solenoid means for intermittently and rotatably driving the rotary cam means whenever energized, and a control circuit means for energizing the solenoid in response to the passage of the ending of each track in play, comprising: a rotary switch means rotatably operated by and synchronized with said rotary cam means, said rotary switch means including a plurality of first switch means corresponding in number to the number of individual tracks on the tape and second switch means for generating said cartridge changing signal, said first and second switch means being successively closed in response to rotation of said rotary switch means; a plurality of track selecting switches corresponding in number to the number of individual tracks on said tape for effecting designation of the track to be played; and a plurality of series connections connecting the track selecting switches in series with the respective first switch means corresponding to the individual tracks on said tape, said series connections being incorporated in said control circuit means, said solenoid means being operable to be energized to rotatably drive the rotary cam means and thereby move the magnetic head past a non-selected track when a first switch means corresponding to a closed track selecting switch is closed by rotation of said rotary switch means and to be deenergized to stop rotation of the rotary cam means and thereby position said magnetic head at a selected track when a first switch means corresponding to an open track selecting switch is closed by rotation of said rotary switch means, the track corresponding to an open track selecting switch being automatically selected and played.

2. A programmed track selecting apparatus for a multiple tape cartridge player utilizing a plurality of multi track endless magnetic tape cartridges in accordance with claim 1 wherein each of said first and second switch means of said rotary switch means consists of a pair of electrically separated contacts, and the rotary switch means includes a rotary disk of insulating material having a conductive piece thereon, said rotary switch means being operable to successively short the contacts by said conductive piece when said rotary disk is rotated in synchronism with said rotary cam means.

3. A programmed track selecting apparatus for a multiple tape cartridge player utilizing a plurality of multi track endless magnetic tape cartridges in accordance with claim 2 wherein said first and second switch means of said rotary switch means are equally spaced from one another.

4. A programmed track selecting apparatus for a multiple tape cartridge player utilizing a plurality of multi track endless magnetic tape cartridges in accordance with claim 2 wherein said first switch means of said rotary switch means are equally spaced from one another, said second switch means being provided between two adjacent first switch means.

5. A programmed track selecting apparatus for a multiple tape cartridge player utilizing a plurality of multi track endless magnetic tape cartridges in accordance with claim 1 wherein track selection means for operating the track selecting switches are provided in the tape cartridge, said track selection means consisting of holes formed in the tape cartridge and corresponding in number to the number of tracks, and members for selectively closing the holes, designation of the selected track being effected in response to the opening and closing of the holes.

* * * * *